United States Patent
M N et al.

(10) Patent No.: US 12,291,325 B2
(45) Date of Patent: May 6, 2025

(54) TEMPERATURE COMPENSATED LANDING GEAR SHOCK STRUT

(71) Applicant: Goodrich Corporation, Charlotte, NC (US)

(72) Inventors: Hemanth M N, Hassan (IN); Basavaraj Bodki, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/460,173

(22) Filed: Sep. 1, 2023

(65) Prior Publication Data
US 2025/0026471 A1  Jan. 23, 2025

(30) Foreign Application Priority Data
Jul. 18, 2023  (IN) .............................. 202341048227

(51) Int. Cl.
*B64C 25/60* (2006.01)
*F16F 9/32* (2006.01)

(52) U.S. Cl.
CPC .............. *B64C 25/60* (2013.01); *F16F 9/32* (2013.01); *F16F 2222/02* (2013.01); *F16F 2222/12* (2013.01); *F16F 2230/08* (2013.01); *F16F 2230/16* (2013.01); *F16F 2230/18* (2013.01)

(58) Field of Classification Search
CPC ......... B64C 25/60; F16F 9/32; F16F 2222/02; F16F 2222/12; F16F 2230/08; F16F 2230/16; F16F 2230/18
See application file for complete search history.

(56) References Cited

U.S. PATENT DOCUMENTS

| | | | |
|---|---|---|---|
| 3,214,116 A | 10/1965 | Utting | |
| 3,802,523 A * | 4/1974 | Clark | G01G 5/00 177/208 |
| 4,616,810 A | 10/1986 | Richardson et al. | |
| 4,629,169 A | 12/1986 | Arnaud et al. | |
| 8,565,968 B2 * | 10/2013 | Nance | B64C 25/60 340/960 |
| 11,378,150 B1 | 7/2022 | Schmidt | |
| 2008/0237396 A1 | 10/2008 | Bietenhader | |
| 2009/0107784 A1 | 4/2009 | Gabriel et al. | |
| 2021/0309389 A1 * | 10/2021 | Kekan | B64F 5/40 |
| 2022/0221021 A1 | 7/2022 | Schmidt | |
| 2022/0388638 A1 * | 12/2022 | Guidoux | B64C 25/60 |
| 2024/0182162 A1 * | 6/2024 | Bodki | F16F 9/342 |
| 2024/0343385 A1 * | 10/2024 | Bodki | B64C 25/60 |

OTHER PUBLICATIONS

European Patent Office, European Search Report dated Dec. 6, 2024 in Application No. 24188604.3.

* cited by examiner

*Primary Examiner* — Rodney A Bonnette
(74) *Attorney, Agent, or Firm* — SNELL & WILMER L.L.P.

(57) ABSTRACT

A landing gear assembly is provided. The landing gear assembly includes a shock strut. The shock strut includes a shock strut cylinder and a shock strut piston slidably disposed within the shock strut cylinder. The landing gear assembly further includes a temperature control unit assembly disposed within the shock strut cylinder. The temperature control unit assembly is configured to, responsive to a temperature within the shock strut cylinder falling below a predetermined temperature, circulate heated fluid into a chamber of the shock strut cylinder to heat gas within the shock strut cylinder.

18 Claims, 4 Drawing Sheets

TEMPERATURE COMPENSATED LANDING GEAR SHOCK STRUT

CROSS-REFERENCE TO RELATED APPLICATIONS

This application claims priority to, and the benefit of, India Provisional Patent Application No. 202341048227, filed Jul. 18, 2023 (DAS Code CC41) and titled "TEMPERATURE COMPENSATED LANDING GEAR SHOCK STRUT," which is incorporated by reference herein in its entirety for all purposes.

FIELD

The present disclosure relates generally to aircraft landing systems and, more particularly, to a temperature compensated landing gear shock strut.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. Shock struts control motion of the landing gear and absorb and damp loads imposed on the gear during landing, taxiing, braking, and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement where a trapped volume of gas is compressed as the shock strut is axially compressed, and a volume of oil is metered through a metering orifice. The gas acts as an energy storage device, similar to a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

SUMMARY

Disclosed herein is a landing gear assembly. The landing gear assembly includes a shock strut and a temperature control unit assembly. The shock strut includes a shock strut cylinder and a shock strut piston slidably disposed within the shock strut cylinder. The temperature control unit assembly is disposed within the shock strut cylinder. The temperature control unit assembly is configured to, responsive to a temperature within the shock strut cylinder falling below a predetermined temperature, circulate heated fluid into a chamber of the shock strut cylinder to heat gas within the shock strut cylinder.

In various embodiments, the temperature control unit assembly includes a temperature regulator; a temperature sensor electrically coupled to the temperature regulator; and a heat exchanger fluidly coupled to the temperature regulator. In various embodiments, the temperature regulator is configured to receive signals from the temperature sensor and circulate the heated fluid from a heated fluid chamber fluidly coupled to the temperature regulator to the heat exchanger in the chamber of the shock strut cylinder. In various embodiments, the temperature sensor is configured to sense the temperature within the shock strut cylinder. In various embodiments, the heat exchanger is configured to heat the gas within the shock strut cylinder. In various embodiments, the heat exchanger is a recirculating coil. In various embodiments, the heated fluid chamber is configured to heat the heated fluid up to the predetermined temperature associated with a design of the shock strut. In various embodiments, the temperature control unit assembly is further configured to, responsive to the temperature within the shock strut cylinder rising up to or above the predetermined temperature, stop the circulation of the heated fluid into the chamber of the shock strut cylinder to heat the gas within the shock strut cylinder.

Also disclosed herein is an aircraft. The aircraft includes a landing gear assembly. The landing gear assembly includes a shock strut and a temperature control unit assembly. The shock strut includes a shock strut cylinder and a shock strut piston slidably disposed within the shock strut cylinder. The temperature control unit assembly is disposed within the shock strut cylinder. The temperature control unit assembly is configured to, responsive to a temperature within the shock strut cylinder falling below a predetermined temperature, circulate heated fluid into a chamber of the shock strut cylinder to heat gas within the shock strut cylinder.

In various embodiments, the temperature control unit assembly includes a temperature regulator; a temperature sensor electrically coupled to the temperature regulator; and a heat exchanger fluidly coupled to the temperature regulator. In various embodiments, the temperature regulator is configured to receive signals from the temperature sensor and circulate the heated fluid from a heated fluid chamber fluidly coupled to the temperature regulator to the heat exchanger in the chamber of the shock strut cylinder. In various embodiments, the temperature sensor is configured to sense the temperature within the shock strut cylinder. In various embodiments, the heat exchanger is configured to heat the gas within the shock strut cylinder. In various embodiments, the heat exchanger is a recirculating coil. In various embodiments, the heated fluid chamber is configured to heat the heated fluid to the predetermined temperature associated with a design of the shock strut. In various embodiments, the temperature control unit assembly is further configured to, responsive to the temperature within the shock strut cylinder rising up to or above the predetermined temperature, stop the circulation of the heated fluid into the chamber of the shock strut cylinder to heat the gas within the shock strut cylinder.

Also disclosed herein is a method of maintaining a compressibility factor of gas in a shock strut of a landing gear assembly of an aircraft. The method includes receiving, by a temperature regulator, a temperature sensed by a temperature sensor; and, responsive to the temperature sensed by the temperature sensor being below a predetermined temperature, circulating, by the temperature regulator, heated fluid from a heated fluid chamber into a heat exchanger within a chamber of a shock strut cylinder to heat gas within the shock strut cylinder.

In various embodiments, the method further includes, responsive to the temperature sensed by the temperature sensor rising to or above the predetermined temperature, stopping, by the temperature regulator, circulation of the heated fluid into the heat exchanger within the chamber of the shock strut cylinder to heat the gas within the shock strut cylinder. In various embodiments, the heat exchanger is a recirculating coil. In various embodiments, the heated fluid chamber is configured to heat the heated fluid up to the predetermined temperature associated with a design of the shock strut.

The present disclosure may include any one or more of the individual features disclosed above and/or below alone or in any combination thereof.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination.

Disclosed herein is an improved landing gear energy absorption for aircraft landing gear systems. An isothermal curve, i.e. a static air spring curve, is representative of typical ground handling activities under which an aircraft landing gear operates. A polytropic curve, i.e. a dynamic air spring curve, is representative of dynamic cases under which an aircraft landing gear operates, such as landing impact or taxi runs, among others. For static air spring computation, a nitrogen compressibility factor (Z) needs to be accounted to accurately model the static air spring curve. However, cold temperatures affects both static and dynamic air spring curves. Therefore, a damping performance of a shock strut within the landing gear varies with a change in temperature, which may increase a risk of bottoming within the shock strut. In that regard, in various embodiments, a temperature control unit assembly is provided that maintains an air spring curve for which the shock strut is designed by regulating a nitrogen gas temperature when the shock strut temperature falls below specific temperature. By regulating a nitrogen gas temperature when the shock strut temperature falls below specific temperature, shock strut performance is improved throughout a landing event and ground operations at certain ambient temperatures.

Figure 1:
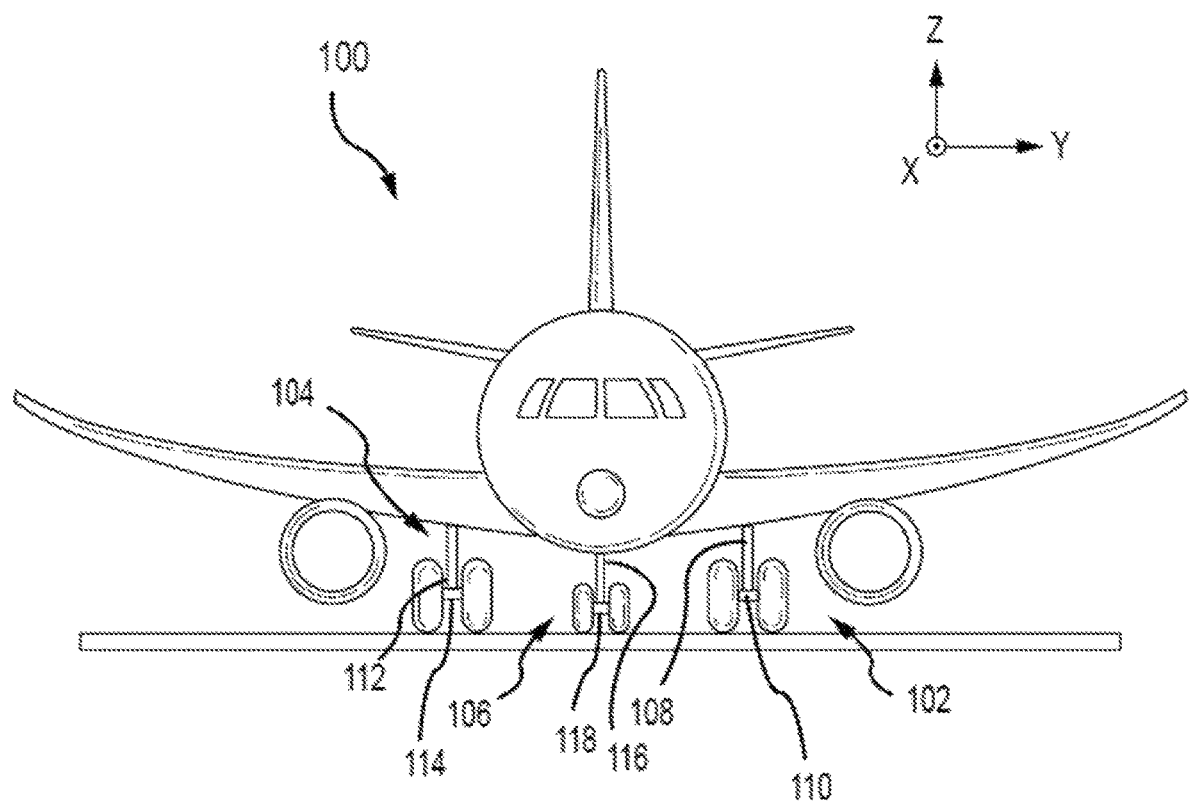
FIG. 1 illustrates an aircraft having left, right and nose landing gear assemblies and wheels mounted thereon, in accordance with various embodiments.

Referring now to FIG. 1, an aircraft 100 is illustrated, in accordance with various embodiments. In accordance with various embodiments, aircraft 100 may include one or more landing gear assemblies, such as, for example, a left landing gear assembly 102 (or port-side landing gear assembly), a right landing gear assembly 104 (or starboard-side landing gear assembly) and a nose landing gear assembly 106. Each of left landing gear assembly 102, right landing gear assembly 104, and nose landing gear assembly 106 may support the aircraft 100 when not flying, allowing aircraft 100 to taxi, takeoff, and land safely and without damage to aircraft 100. In various embodiments, left landing gear assembly 102 may include a left shock strut assembly 108 and a left wheel assembly 110, right landing gear assembly 104 may include a right shock strut assembly 112 and a right wheel assembly 114, and nose landing gear assembly 106 may include a nose shock strut assembly 116 and a nose wheel assembly 118.

Figure 2:
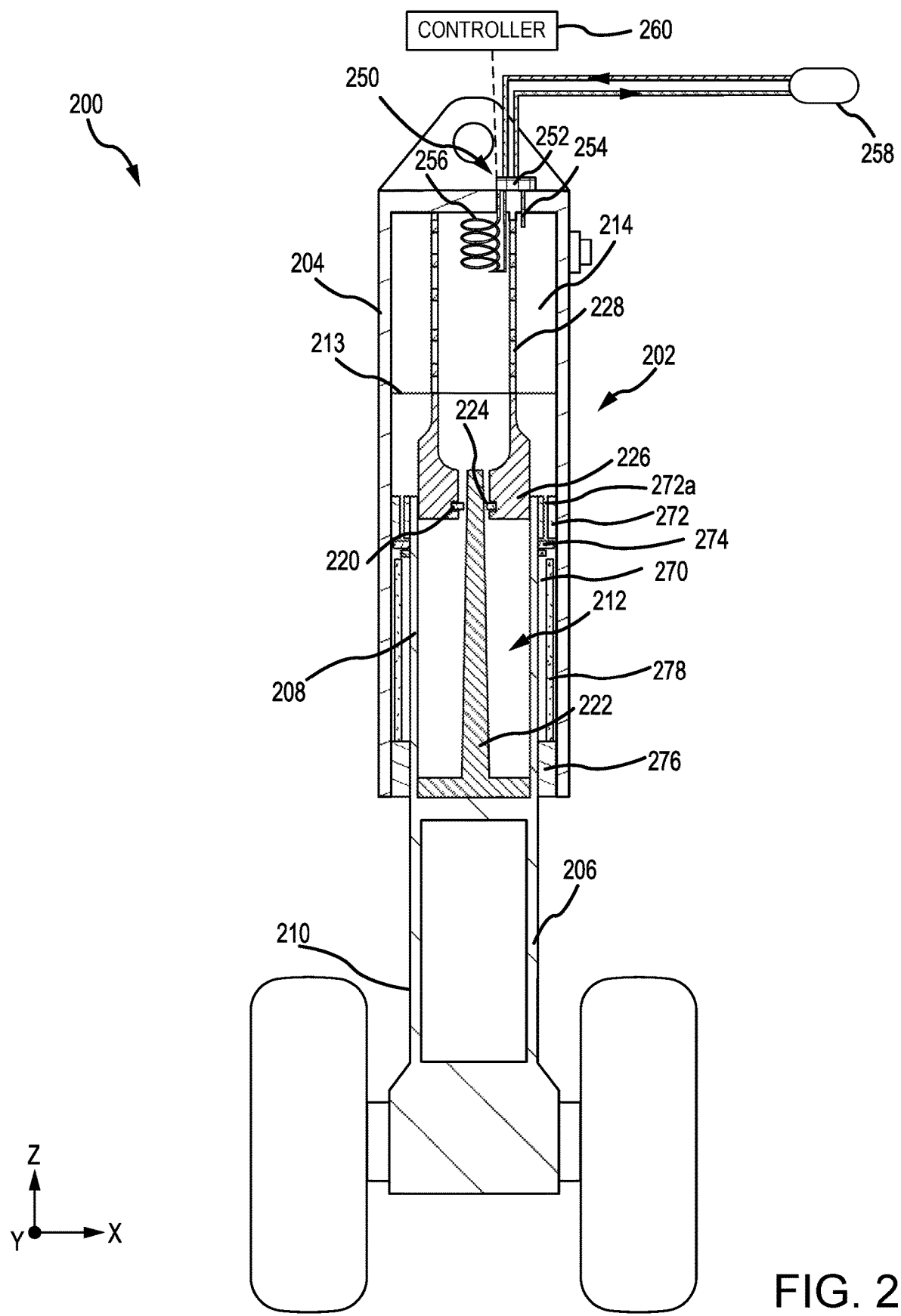
FIG. 2 illustrates various mechanical components of a shock strut landing gear assembly in an extended or landing position, in accordance with various embodiments.

Referring now to FIG. 2, a landing gear assembly 200, similar to the landing gear assemblies described above with reference to FIG. 1, in an extended or landing position is illustrated in accordance with various embodiments. In various embodiments, landing gear assembly 200 includes a shock strut 202, which itself may include a shock strut cylinder 204 and a shock strut piston 206. Shock strut piston 206 is operatively coupled to slide or telescope within shock strut cylinder 204. Shock strut piston 206 may include a first end 208 disposed within shock strut cylinder 204 and a second end 210 extending from shock strut cylinder 204. Shock strut cylinder 204 may be configured to receive shock strut piston 206 in a manner that allows the two components to telescope together and absorb and dampen forces transmitted thereto. FIG. 2 illustrates shock strut 202 in an extended position. When in a compressed position, shock strut piston 206 will have translated or slid a distance into shock strut cylinder 204 from that illustrated in FIG. 2.

Shock strut cylinder 204 may be divided into a liquid chamber 212 and a mixed fluid chamber 214 as indicated by a line 213. In various embodiments, a liquid, such as, for example, hydraulic fluid or oil, may be located within liquid chamber 212. Further, in various embodiments, fluid may be used to indicate the presence of a liquid and/or a gas (e.g., mixed fluid chamber 214). In various embodiments, shock strut cylinder 204 and shock strut piston 206 are configured to seal (e.g., via a first seal ring) such that the liquid contained within liquid chamber 212 is prevented from leaking into mixed fluid chamber 214 as shock strut piston 206 translates relative to shock strut cylinder 204. In various embodiments, shock strut 202 includes an orifice plate 220 configured to separate liquid chamber 212 (also referred to herein as a first chamber or a dynamic liquid chamber) from mixed fluid chamber 214 (also referred to herein as a second chamber or a mixed gas/liquid chamber). In this regard, during operation, the liquid, such as, for example, hydraulic fluid or oil, may be located within liquid chamber 212 (or the first or dynamic liquid chamber) and a mixture of a gas, such as, for example, nitrogen gas ($N_2$) or air, and the liquid may be located within mixed fluid chamber 214 (or the second or mixed gas/liquid chamber).

In various embodiments, the shock strut 202 includes a metering pin 222 coupled to shock strut piston 206 and configured to translate with shock strut piston 206. In various embodiments, metering pin 222 is received by and extends through orifice plate 220. Orifice plate 220 may include a metering pin aperture 224 configured to receive metering pin 222. In various embodiments, metering pin 222 includes a metering flute (or a plurality of metering flutes) disposed along the length (e.g., along the Z-direction) of the metering pin 222. As described herein, the metering flute defines a flow channel between metering pin 222 and metering pin aperture 224 of orifice plate 220 through which liquid may travel from liquid chamber 212 to mixed fluid chamber 214 in response to shock strut 202 moving to a compressed position from an extended position. In various embodiments, orifice plate 220 is housed within a retainer housing 226 and may include a retainer plate. Orifice plate 220 is typically annular in shape and secured to an orifice support tube 228. Retainer housing 226 and, in various embodiments the retainer plate, are configured to restrict, but not prevent, the flow of fluid (e.g., liquid and/or gas) from liquid chamber 212 into mixed fluid chamber 214 during compression of shock strut 202. In various embodiments, orifice plate 220 may be free to move within a channel formed in the orifice retainer plate.

Landing gear assembly 200, and more specifically the shock strut 202, further includes a rebound chamber 270, an upper bearing 272, a rebound ring 274, a lower bearing 276, and an out-stop tube 278. Rebound chamber 270 may provide dampening for shock strut piston 206 during shock strut piston 206 extension. In various embodiments, rebound chamber 270 may be annular and located between shock strut cylinder 204 and shock strut piston 206. Upper bearing 272 and lower bearing 276 may permit the shock strut piston 206 and shock strut cylinder 204 to telescope together. Upper bearing 272 may include an opening 272a through which oil may pass into and out rebound chamber 270. Rebound ring 274 partially seals the opening 272a, restricting the flow of fluid (e.g., oil and/or gas) from rebound chamber 270 into liquid chamber 212 and thereby improving the dampening effect of rebound chamber 270 during shock strut piston 206 extension.

Landing gear assembly 200, and more specifically the shock strut 202, further includes, in various embodiments, a temperature control unit assembly 250 to maintain an air spring curve for which the shock strut is designed. In various embodiments, the temperature control unit assembly 250 includes a temperature regulator 252, a temperature sensor 254, a heat exchanger 256, and a heated fluid chamber 258 that is fluidly coupled to the temperature regulator 252. In various embodiments, the temperature regulator 252 is electrically coupled to a controller 260 within the aircraft 100 of FIG. 1. In various embodiments, the controller provides power to the temperature regulator 252 and thus, the temperature sensor 254. In various embodiments, the temperature sensor 254 is electrically and communicatively coupled to the temperature regulator 252. In various embodiments, the heat exchanger 256 may be fluidly coupled to the temperature regulator 252. In various embodiments, the heat exchanger 256 may be a recirculating coil, among others. In various embodiments, the heated fluid chamber 258 may also be fluidly coupled to the temperature regulator 252. In various embodiments, the heated fluid chamber 258 is configured to heat fluid contained within to a predetermined temperature for a design of the associated shock strut.

In various embodiments, the temperature sensor 254 senses a temperature of the gas, such as nitrogen gas ($N_2$) or air, within the mixed fluid chamber 214 of the shock strut cylinder 204. In various embodiments, the temperature regulator 252 monitors the temperature sensed by the temperature sensor 254. In various embodiments, responsive to the temperature sensed by the temperature sensor 254 falling below a predetermined temperature, i.e. a temperature to maintain the air spring curve within a predetermined range, i.e. a range designed for the associated shock strut, the temperature regulator 252 is configured to circulate heated fluid from the heated fluid chamber 258 to the heat exchanger 256 to heat the gas in mixed fluid chamber 214 in order to maintain the air spring curve at a desirable level, i.e. a level designed for the associated shock strut. In that regard the temperature regulator 252 is configured to circulate cooled fluid from the heat exchanger 256 back to the heated fluid chamber 258 for reheating. Accordingly, in various embodiments, by heating the gas, a compressibility factor of the gas is maintained at greater than or equal to 1 at desired times. In that regard, in various embodiments, by maintaining the compressibility factor of the gas at greater than or equal to 1 at desired times, a performance of the shock strut will substantially be as desired, preventing or tending to prevent overload conditions during landing or any ground operations. Furthermore, by heating the gas in the mixed fluid chamber 214, liquid in the mixed fluid chamber 214 and the liquid chamber 212 may be heated, thereby improving a fluid viscosity of the liquid responsive to the ambient temperature dropping below optimal temperature, thereby improving the energy absorption of the shock strut at cold temperatures. In various embodiments, responsive to the temperature sensed by the temperature sensor 254 rising up to or above the predetermined temperature, i.e. the temperature to maintain the air spring curve at an optimum level, the temperature regulator 252 stop the circulation of heated fluid from the heated fluid chamber 258 to the heat exchanger 265 and stop the circulation of cooled fluid from the heat exchanger 256 back to the heated fluid chamber 258.

Figure 3:
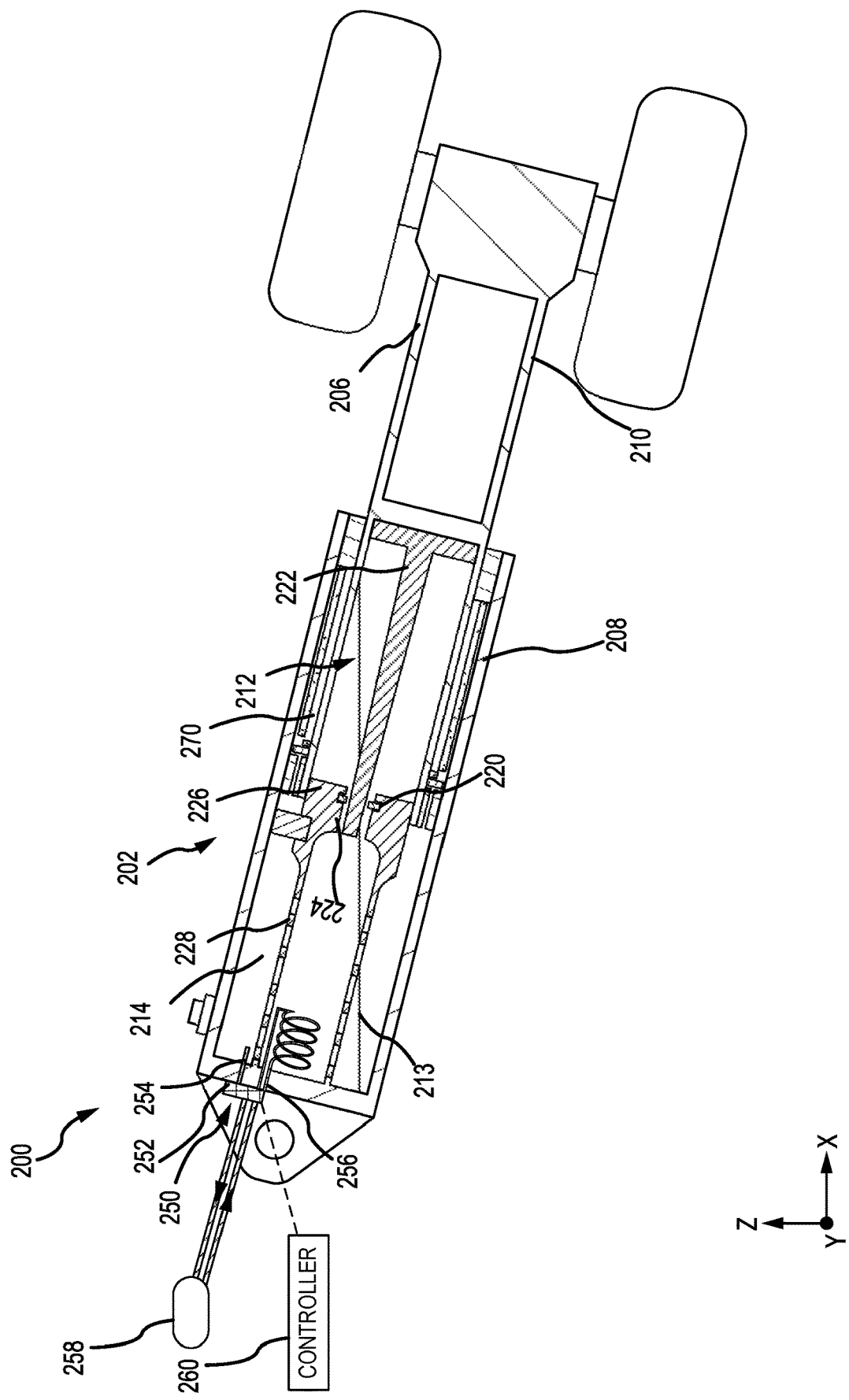
FIG. 3 illustrates various mechanical components of a shock strut landing gear assembly in a retracted or stowed position, in accordance with various embodiments.

Referring now to FIG. 3, illustrated is landing gear assembly 200 of FIG. 2 in a retracted or stowed position, in accordance with various embodiments. As illustrated, landing gear assembly 200 is stowed below horizontal (e.g., below the x-axis) with liquid chamber 212 being below mixed fluid chamber 214. In various embodiments, landing gear assembly 200 may be stowed horizontally (e.g., parallel to the x-axis) with liquid chamber 212 being in line with mixed fluid chamber 214. In various embodiments, landing gear assembly 200 may be stowed above horizontal (e.g., above the x-axis) with liquid chamber 212 being above mixed fluid chamber 214. As illustrated in FIG. 3, the temperature control unit assembly 250 is configured such that the heat exchanger 256 is positioned within the gas portion of the mixed fluid chamber 214, i.e. above line 213 regardless of whether the landing gear assembly 200 is in an extended or landing position, as illustrated in FIG. 2 or in a retracted or stowed position as illustrated in FIG. 3.

Figure 4:
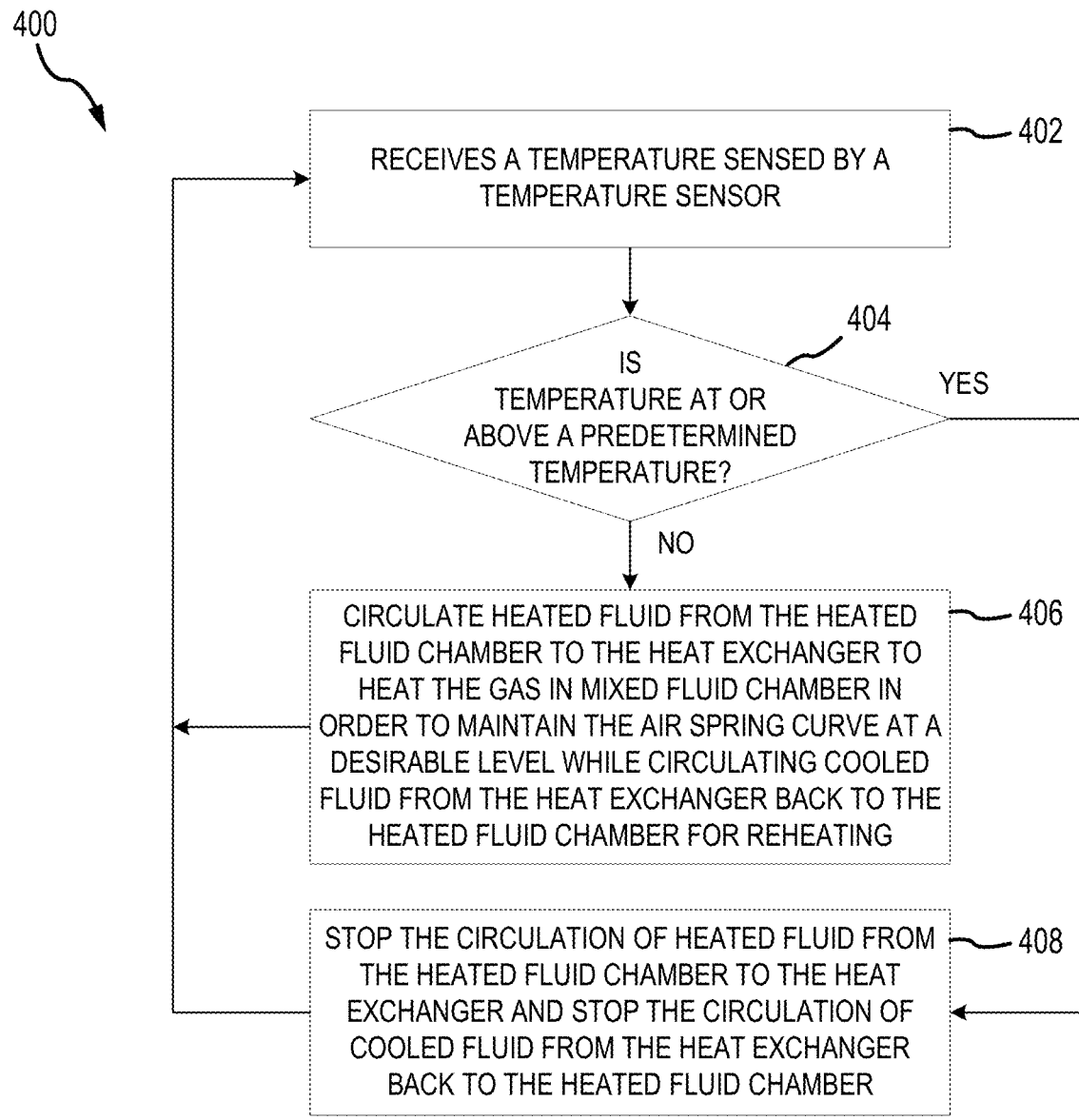
FIG. 4 describes a method for maintaining a compressibility factor of gas in a shock strut of a landing gear assembly of an aircraft, in accordance with various embodiments.

Referring now to FIG. 4, a method 400 for maintaining a compressibility factor of gas in a shock strut of a landing gear of an aircraft is described, in accordance with various embodiments. At block 402, a temperature regulator 252 receives a temperature sensed by a temperature sensor 254. At block 404, the temperature regulator 252 determines whether the temperature sensed by the temperature sensor 254 is below a predetermined temperature, i.e. a temperature to maintain the air spring curve at a desirable level, i.e. a level designed for the associated shock strut. If at block 404 the temperature is below the predetermined temperature, at block 406, the temperature regulator 252 circulates heated fluid from the heated fluid chamber 258 to the heat exchanger 256 to heat the gas in mixed fluid chamber 214 in order to maintain the air spring curve at a desirable level while circulating cooled fluid from the heat exchanger 256 back to the heated fluid chamber 258 for reheating, with the operation returning to block 402 thereafter. If at block 404 the temperature rises to or above the predetermined temperature, at block 408, the temperature regulator 252 stops the circulation of heated fluid from the heated fluid chamber 258 to the heat exchanger 265 and stops the circulation of cooled fluid from the heat exchanger 256 back to the heated fluid chamber 258, with the operation returning to block 402 thereafter.

System program instructions and/or temperature regulator instructions may be loaded onto a non-transitory, tangible computer-readable medium having instructions stored thereon that, in response to execution by a temperature regulator, cause the temperature regulator to perform various operations. The term "non-transitory" is to be understood to remove only propagating transitory signals per se from the claim scope and does not relinquish rights to all standard computer-readable media that are not only propagating transitory signals per se.

Thus, in various embodiments, by providing a temperature control unit assembly, such as temperature control unit assembly 250 of FIGS. 2 and 3, that maintains a compressibility factor of the gas within the shock strut at greater than or equal to 1 at desired times and improving a fluid viscosity of the liquid in the shock strut, in various embodiments, the temperature control unit assembly may reduce or prevent damage to the shock strut in case of an overload event at subzero temperatures, and provides for predictable performance. In various embodiments, the temperature control unit assembly may reduce or prevent liquid contraction due to drop in temperature in cold conditions. Furthermore, in various embodiments, the temperature control unit assembly may be implemented in landing gears of all sizes, is a robust and cost-effective solution, may be retrofitted with minimal design modifications, and has minimal weight impact.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A landing gear assembly, comprising:
   a shock strut comprising:
     a shock strut cylinder; and
     a shock strut piston slidably disposed within the shock strut cylinder; and
   a temperature control unit assembly disposed within the shock strut cylinder, wherein the temperature control unit assembly is configured to:
     responsive to a temperature within the shock strut cylinder falling below a predetermined temperature, circulate heated fluid into a chamber of the shock strut cylinder to heat gas within the shock strut cylinder; and
     responsive to the temperature within the shock strut cylinder rising up to or above the predetermined temperature, stop the circulation of the heated fluid into the chamber of the shock strut cylinder to heat the gas within the shock strut cylinder.

2. The landing gear assembly of claim 1, wherein the temperature control unit assembly comprises:
   a temperature regulator;
   a temperature sensor electrically coupled to the temperature regulator; and
   a heat exchanger fluidly coupled to the temperature regulator.

3. The landing gear assembly of claim 2, wherein the temperature regulator is configured to receive signals from the temperature sensor and circulate the heated fluid from a heated fluid chamber fluidly coupled to the temperature regulator to the heat exchanger in the chamber of the shock strut cylinder.

4. The landing gear assembly of claim 3, wherein the heated fluid chamber is configured to heat the heated fluid up to the predetermined temperature associated with a design of the shock strut.

5. The landing gear assembly of claim 2, wherein the temperature sensor is configured to sense the temperature within the shock strut cylinder.

6. The landing gear assembly of claim 2, wherein the heat exchanger is configured to heat the gas within the shock strut cylinder.

7. The landing gear assembly of claim 6, wherein the heat exchanger is a recirculating coil.

8. An aircraft, comprising:
a landing gear assembly, the landing gear assembly comprising:
a shock strut comprising:
a shock strut cylinder; and
a shock strut piston slidably disposed within the shock strut cylinder; and
a temperature control unit assembly disposed within the shock strut cylinder, wherein the temperature control unit assembly is configured to:
responsive to a temperature within the shock strut cylinder falling below a predetermined temperature, circulate heated fluid into a chamber of the shock strut cylinder to heat gas within the shock strut cylinder; and
responsive to the temperature within the shock strut cylinder rising up to or above the predetermined temperature, stop the circulation of the heated fluid into the chamber of the shock strut cylinder to heat the gas within the shock strut cylinder.

9. The aircraft of claim 8, wherein the temperature control unit assembly comprises:
a temperature regulator;
a temperature sensor electrically coupled to the temperature regulator; and
a heat exchanger fluidly coupled to the temperature regulator.

10. The aircraft of claim 9, wherein the temperature regulator is configured to receive signals from the temperature sensor and circulate the heated fluid from a heated fluid chamber fluidly coupled to the temperature regulator to the heat exchanger in the chamber of the shock strut cylinder.

11. The aircraft of claim 10, wherein the heated fluid chamber is configured to heat the heated fluid to the predetermined temperature associated with a design of the shock strut.

12. The aircraft of claim 9, wherein the temperature sensor is configured to sense the temperature within the shock strut cylinder.

13. The aircraft of claim 9, wherein the heat exchanger is configured to heat the gas within the shock strut cylinder.

14. The aircraft of claim 13, wherein the heat exchanger is a recirculating coil.

15. A method of maintaining a compressibility factor of gas in a shock strut of a landing gear assembly of an aircraft, comprising:
receiving, by a temperature regulator, a temperature sensed by a temperature sensor; and
responsive to the temperature sensed by the temperature sensor being below a predetermined temperature, circulating, by the temperature regulator, heated fluid from a heated fluid chamber into a heat exchanger within a chamber of a shock strut cylinder to heat gas within the shock strut cylinder.

16. The method of claim 15, further comprising:
responsive to the temperature sensed by the temperature sensor rising to or above the predetermined temperature, stopping, by the temperature regulator, circulation of the heated fluid into the heat exchanger within the chamber of the shock strut cylinder to heat the gas within the shock strut cylinder.

17. The method of claim 15, wherein the heat exchanger is a recirculating coil.

18. The aircraft of claim 15, wherein the heated fluid chamber is configured to heat the heated fluid up to the predetermined temperature associated with a design of the shock strut.

* * * * *